US012679309B2

(12) United States Patent
Lee et al.

(10) Patent No.: US 12,679,309 B2
(45) Date of Patent: Jul. 14, 2026

(54) SENSOR CLEANING DEVICE

(71) Applicants: HYUNDAI MOTOR COMPANY, Seoul (KR); KIA CORPORATION, Seoul (KR)

(72) Inventors: Ki Hong Lee, Seoul (KR); Jong Min Park, Seoul (KR); Seung Hyeok Chang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 336 days.

(21) Appl. No.: 18/238,820

(22) Filed: Aug. 28, 2023

(65) Prior Publication Data

US 2024/0067135 A1 Feb. 29, 2024

(30) Foreign Application Priority Data

Aug. 29, 2022 (KR) ........................ 10-2022-0108263

(51) Int. Cl.
| | |
|---|---|
| *B60S 1/56* | (2006.01) |
| *B60R 11/00* | (2006.01) |
| *B60R 11/04* | (2006.01) |
| *B60S 1/52* | (2006.01) |
| *G02B 27/00* | (2006.01) |

(52) U.S. Cl.
CPC ......... *B60S 1/566* (2013.01); *B60R 2011/004* (2013.01); *B60R 11/04* (2013.01); *B60S 1/52* (2013.01); *B60S 1/56* (2013.01); *G02B 27/0006* (2013.01)

(58) Field of Classification Search
CPC .... B60S 1/566; B60S 1/52; B60S 1/04; B60S 1/56; G03B 17/02; G02B 27/00; G02B 27/0006; B60R 1/00
USPC ..................................................... 15/250.001
See application file for complete search history.

(56) References Cited

U.S. PATENT DOCUMENTS

| | | | |
|---|---|---|---|
| 10,549,726 B2 | 2/2020 | Garcia Crespo et al. | |
| 2018/0009418 A1* | 1/2018 | Newman | .................. B08B 1/16 |
| 2019/0016310 A1* | 1/2019 | Matesic | ............... B60S 1/0411 |
| 2021/0061237 A1* | 3/2021 | Krishnan | .............. G01S 7/4813 |

* cited by examiner

*Primary Examiner* — Katina N. Henson
(74) *Attorney, Agent, or Firm* — Lempia Summerfield Katz LLC

(57) ABSTRACT

A sensor cleaning device includes a sensor cover configured to cover an outer surface of a sensor lens. The sensor cleaning device also includes a moving unit configured to support the sensor cover and move the sensor cover between a first position and a second position. The sensor lens is covered by the sensor cover positioned at the first position and uncovered by the sensor cover positioned at the second position. The sensor cleaning device also includes a cleaning unit configured to clean an outer surface of the sensor cover upon the sensor cover being moved to the second position.

19 Claims, 6 Drawing Sheets

SENSOR CLEANING DEVICE

CROSS-REFERENCE TO RELATED APPLICATION

The present application claims priority to Korean Patent Application No. 10-2022-0108263, filed on Aug. 29, 2022, the entire contents of which are incorporated herein by reference in its entirety.

TECHNICAL FIELD

The present disclosure relates to a device for cleaning the surface of a sensor cover surrounding a sensor used in an autonomous vehicle with advanced autonomous driving functions.

BACKGROUND

The functionality of autonomous driving at level 3 or higher, which includes autonomous driving on a highway, autonomous parking, and the autonomous driving functions like general road driving, complex urban driving and the like, necessitates the use of high-resolution sensor. These sensors sense people, objects, structures, and the like, by monitoring front view and environment of a vehicle (e.g., a host vehicle).

In general, for autonomous driving, sensors are mounted on a roof of the vehicle or on the front, rear, left, and right exterior thereof and exposed to the exterior of the vehicle. The sensor includes a laser transmission unit, a laser reception unit, a driving unit, and the like, and may further include a sensor lens that protects the sensor from outer contaminants.

A Light Detection and Ranging (LiDAR) cleaning device uses a method of spraying cleaning solution onto the surface of a sensor lens, but there is no function of wiping the surface of the sensor lens, and thus there is a problem with the cleaning solution remaining on the surface of the sensor lens, which are irremovable. When the cleaning solution is not removed, the cleaning solution drops remain on the surface, and in this case, the cleaning solution drops are recognized as foreign substances. Thus, this causes problems such as a decrease in sensing accuracy of the LiDAR.

In order to solve this problem, a method of removing water drops by spraying high-pressure air to a sensor lens or removing cleaning solution drops through high-speed driving for a predetermined time is used, but a problem that affects the performance of the sensor for the certain period of time still occurs.

In addition, a method of installing a separate wiper in a sensor lens has been proposed due to the above issue, but because the wiper is recognized as an obstacle when the wiper is in operation, there is a problem wherein the performance of the sensor is affected during a certain period of time.

In addition, when the cleaning solution is sprayed onto the outer surface of the sensor lens, the cleaning solution may be scattered around due to the spraying pressure for cleaning and may cause collateral contamination such as splashing to a vehicle and a pedestrian or another vehicle passing around the vehicle. In general, the sensor is mounted on the outside of the vehicle in order to secure performance. The dispersion with road rocks and contaminants leading to collision on the sensors can cause the problems with the likes of downgrading of advanced sensor performance and damages to the sensor lenses.

The above-described background technology is only for enhancing understanding of the technical field of the present disclosure, and should not be accepted as a recognition in correspondence to the prior art already known to those having ordinary skill in the art.

SUMMARY

Various aspects of the present disclosure provide a sensor cleaning device of a new type, which forms a window cover on the front surface of a lens to prevent and protect the sensor lens from direct contamination. The sensor cleaning device moves to a separate cleaning space when the cover window is contaminated and returns the sensor after cleaning is finished.

A sensor cleaning device according to an embodiment of the present disclosure comprises a sensor cover configured to cover an outer surface of a sensor lens. The sensor cleaning device also comprises a moving unit configured to support the sensor cover and move the sensor cover between a first position and a second position. The sensor lens is covered by the sensor cover positioned at the first position and uncovered by the sensor cover positioned at the second position. The sensor cleaning device also comprises a cleaning unit configured to clean an outer surface of the sensor cover when the sensor cover is moved to the second position.

In at least one embodiment of the present disclosure, the device further comprises a rotating unit configured to rotate the moving unit and the sensor cover.

In at least one embodiment of the present disclosure, the moving unit comprises a sensor cover supporting unit comprising a sensor cover support groove configured to be coupled to a lower part of the sensor cover on an upper portion of the cover supporting unit, at least one movement guide, and a screw hole formed through the cover supporting unit and comprising first threads on an inner circumferential surface thereof. The moving unit also comprises a base unit comprising a first base plate and at least one guide rail placed on the first base plate and configured to guide a movement of the least one movement guide. The moving unit also comprises a threaded gear rotatably supported by the first base plate. The threaded gear comprises second threads on an outer surface thereof to be coupled with the first threads of the screw hole and a first gear. The moving unit also comprises a first motor supported by the first base plate. The moving unit also comprises a second gear connected to a first motor shaft of the first motor and coupled with the threaded gear in gear engagement.

In at least one embodiment of the present disclosure, the rotating unit comprises a second motor comprising a second motor shaft connected to a third gear, and the base unit comprises a fourth gear coupled to the third gear in gear engagement.

In at least one embodiment of the present disclosure, the cleaning unit comprises a cleaner contacting the outer surface of the sensor cover when the sensor cover is positioned at the second position. The cleaning unit also comprises a spray nozzle that sprays cleaning solution on the outer surface of the sensor cover. The cleaning unit also comprises a drying unit that dries the sensor cover by supplying air.

In at least one embodiment of the present disclosure, the cleaner comprises a wiper.

In at least one embodiment of the present disclosure, the spray nozzle comprises a plurality of spray holes arranged in a row along a longitudinal direction of the sensor cover.

In at least one embodiment of the present disclosure, the base unit further comprises a second base plate formed at an end of an upper part of the guard rail, and the sensor cleaning device further comprises a first roller mounted on the second base plate and a second roller mounted on the second base plate.

In at least one embodiment of the present disclosure, the rotating unit further comprises a sensor supporting member supporting a lower part of the sensor. The sensor supporting member comprises a support plate comprising a rotating rail part and a roller separation preventer protruding inward and outward in a radial direction on an end of the rotating rail part. The sensor supporting member further comprises a fixing shaft supporting a lower center portion of the support plate and rotatably supporting the second base plate. The sensor supporting member further comprises a fixing plate formed on a lower part of the fixing shaft.

In at least one embodiment of the present disclosure, the base unit and a fourth gear are mounted on the fixing shaft, the first roller contacts an inner circumferential surface of the rotating rail part, and the second roller contacts an outer circumferential surface of the rotating rail part to guide a rotation of the base unit.

In at least one embodiment of the present disclosure, the device further comprises an upper cover configured to be coupled to an upper part of the sensor cover.

In at least one embodiment of the present disclosure, the sensor cover comprises a wiping blade on an upper part thereof which is configured to clean a surface of the sensor lens while the sensor cover moves.

According to an embodiment of the present disclosure, a method for controlling a sensor cleaning device comprises determining surface contamination of a sensor cover positioned to cover a sensor; descending the sensor cover; cleaning the sensor cover after the descending of the sensor cover; and ascending the sensor cover.

In at least one embodiment of the method of the present disclosure, the method further comprises determining whether to additionally clean the sensor cover by determining additionally surface contamination of the sensor cover after the ascending of the sensor cover.

In at least one embodiment of the method of the present disclosure, the determination of the surface contamination comprises determining the surface contamination through a sensing result of the sensor.

In at least one embodiment of the method of the present disclosure, the cleaning of the sensor cover comprises rotating the sensor cover by a rotating unit.

In at least one embodiment of the method of the present disclosure, the cleaning of the sensor cover comprises spraying cleaning solution while the sensor cover being rotated.

Due to moving the cover window to a separate cleaning space and depending on the cleaning tool of wiper to return after cleaning, the present disclosure prevents the issue of LiDAR sensing accuracy to downgrade due to the cleaning tools, and cleaning the vehicle can achieve the prevention of rocks and other contaminants directly colliding on the exterior of vehicles and prevent scattering of cleaning solution when cleaning the vehicle The obtainable effects from the present disclosure are not limited to the above-mentioned effects, and other effects not mentioned should be clearly understood from the following description by those having ordinary skill in the art to which the present disclosure pertains.

Figure 1:
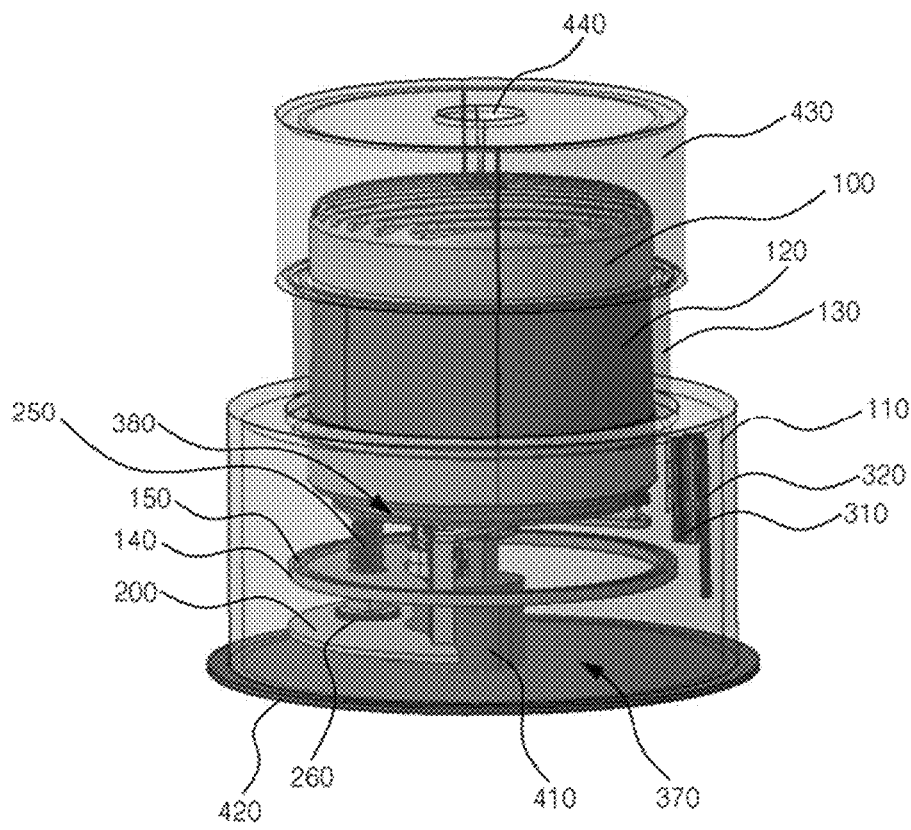
FIG. 1 is a view illustrating a sensor cleaning device according to an embodiment of the present disclosure.

The drawings described herein are for illustration purposes only and are not intended to limit the scope of the present disclosure in any way.

DETAILED DESCRIPTION

Reference is now made in detail to various embodiments of the present disclosure(s), examples of which are illustrated in the accompanying drawings and described below. While the present disclosure(s) is described in conjunction with embodiments of the present disclosure, it should be understood that the present description is not intended to limit the present disclosure(s) to those embodiments of the present disclosure. On the other hand, the present disclosure(s) is/are intended to cover not only the embodiments of the present disclosure, but also various alternatives, modifications, equivalents, and other embodiments, which may be included within the spirit and scope of the present disclosure as defined by the appended claims.

In case where identical or equivalent elements are included in various embodiments, these elements are given the same reference numerals, and redundant description thereof has been omitted. In the following description, the terms "module" and "unit" for referring to elements are assigned and used interchangeably in consideration of convenience of explanation, and thus the terms per se do not necessarily have different meanings or functions.

Furthermore, in describing the embodiments, when it is determined that a detailed description of related publicly known technology may obscure the gist of the embodiments, the detailed description thereof has been omitted. The accompanying drawings are used to help easily explain various technical features and it should be understood that the embodiments presented herein are not limited by the accompanying drawings. Accordingly, the present disclosure should be construed to extend to any alterations, equivalents, and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In the embodiment, it should be understood that a term such as "include" or "have" is intended to designate that the features, numbers, steps, operations, elements, parts, or combinations thereof described in the specification are present, and this term does not preclude the possibility of addition or presence of one or more other features, numbers, steps, operations, elements, parts, or combinations thereof.

Unless otherwise defined, all terms including technical and scientific ones used herein have the same meanings as those commonly understood by one of ordinary skill in the art to which the present disclosure belongs. It should be further understood that terms, such as those defined in commonly used dictionaries, should be interpreted as having meanings consistent with their meanings in the context of the relevant art and the present disclosure and should not be interpreted in an idealized or overly formal sense unless expressly so defined herein.

Hereinafter, the embodiments are described in detail with reference to the accompanying drawings, in which equal or corresponding elements are given equal reference numbers regardless of drawing symbols, and redundant descriptions thereof has been omitted.

Figure 2:
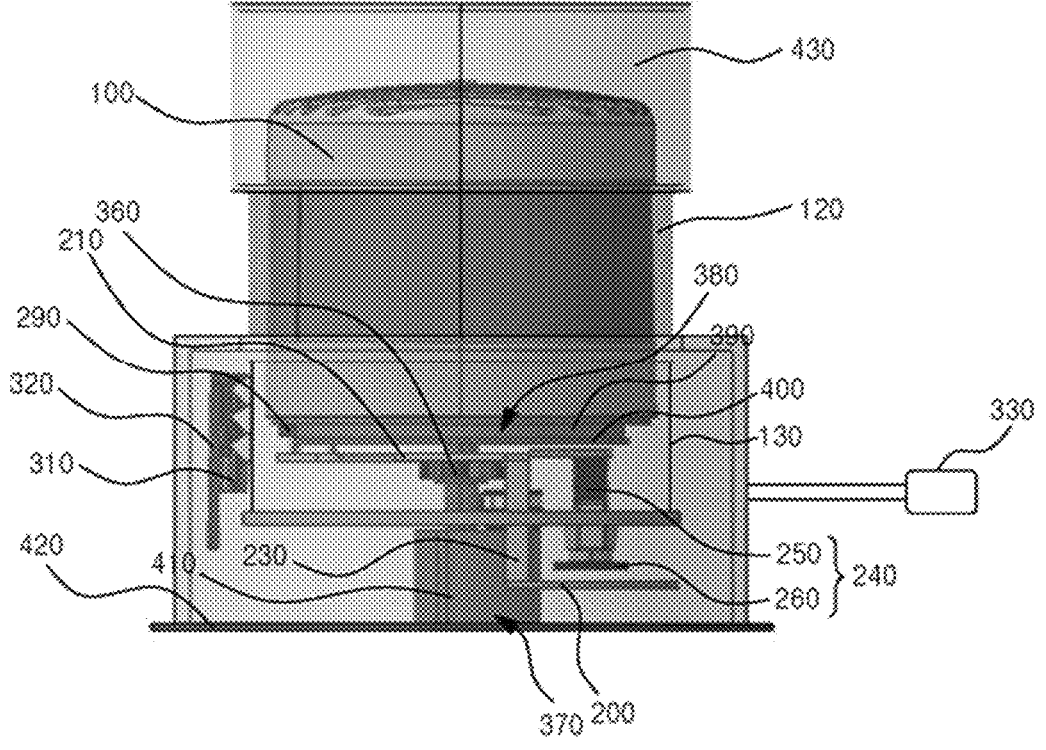
FIG. 2 is a view illustrating a side surface of the sensor cleaning device according to an embodiment of the present disclosure.
Figure 3:
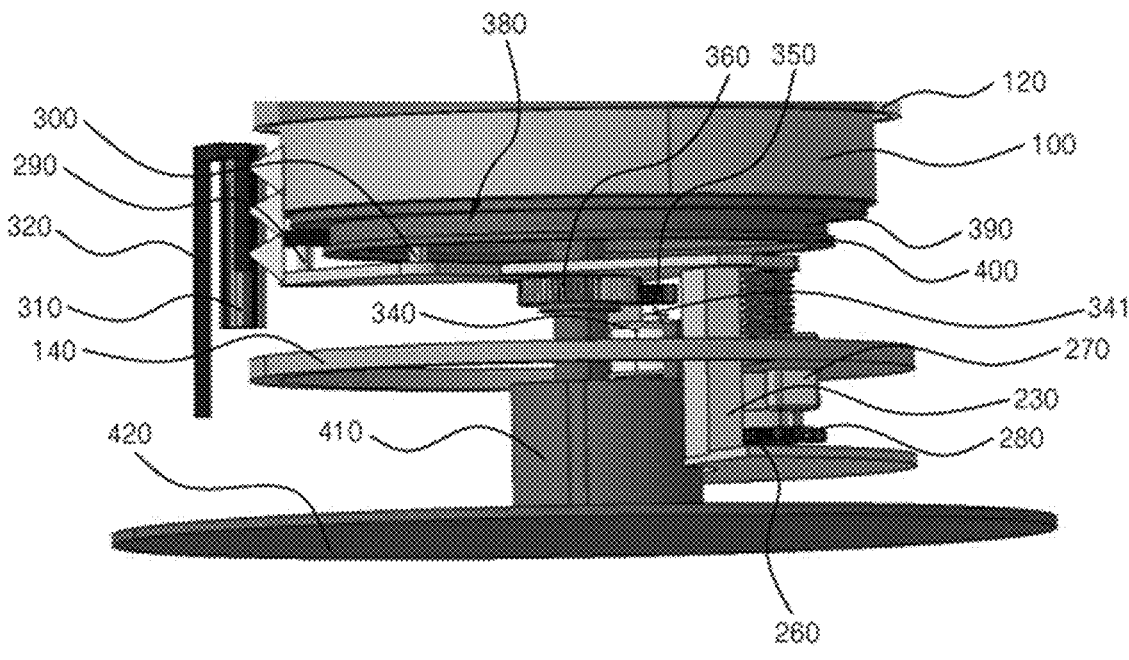
FIG. 3 is a view illustrating a moving unit and a rotating unit of the sensor cleaning device according to an embodiment of the present disclosure.

FIG. 1 is a drawing illustrating a sensor device comprising a sensor cleaning device according to an embodiment of the present disclosure, FIG. 2 is a drawing illustrating a side surface of the sensor cleaning device according to an embodiment of the present disclosure, and FIG. 3 is a drawing illustrating the moving unit and the rotating unit in the sensor cleaning device according to an embodiment of the present disclosure.

Figure 4:
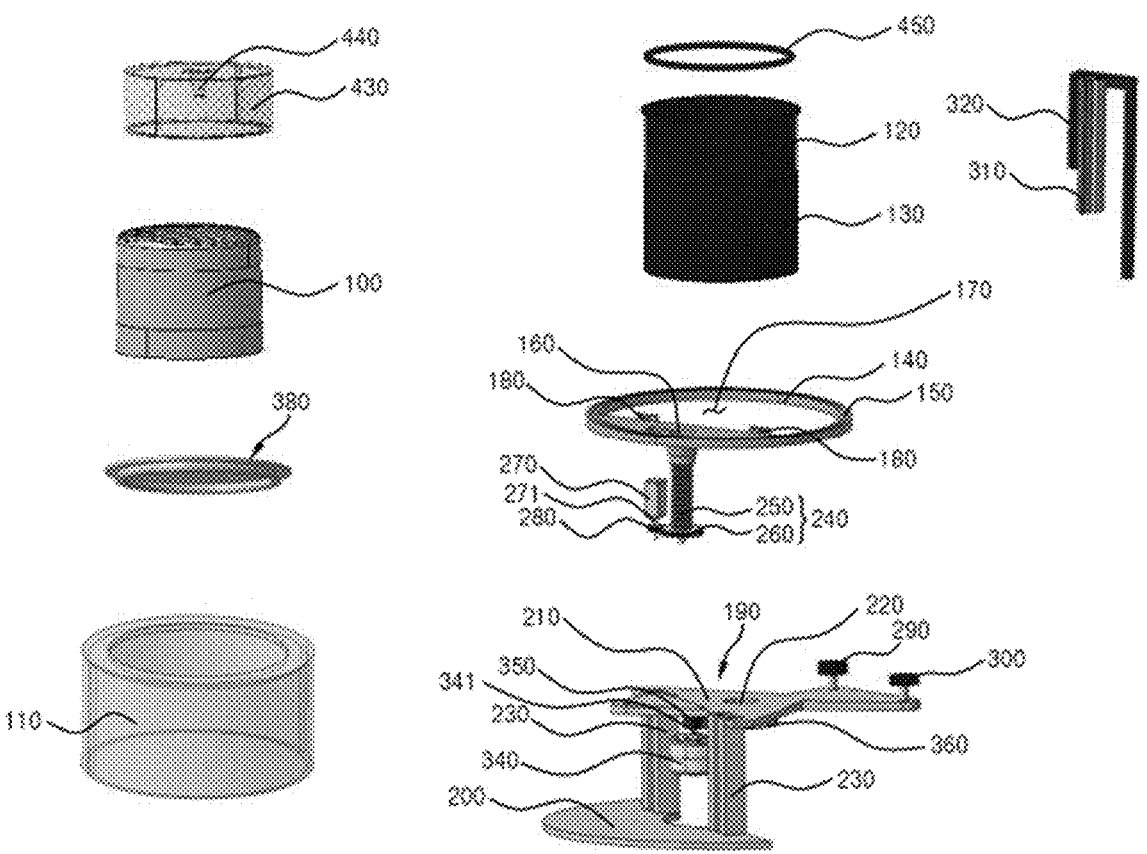
FIG. 4 is an exploded view of a moving unit and a rotating unit in the sensor cleaning device according to an embodiment of the present disclosure.
Figures 5A, 5B, 5C:
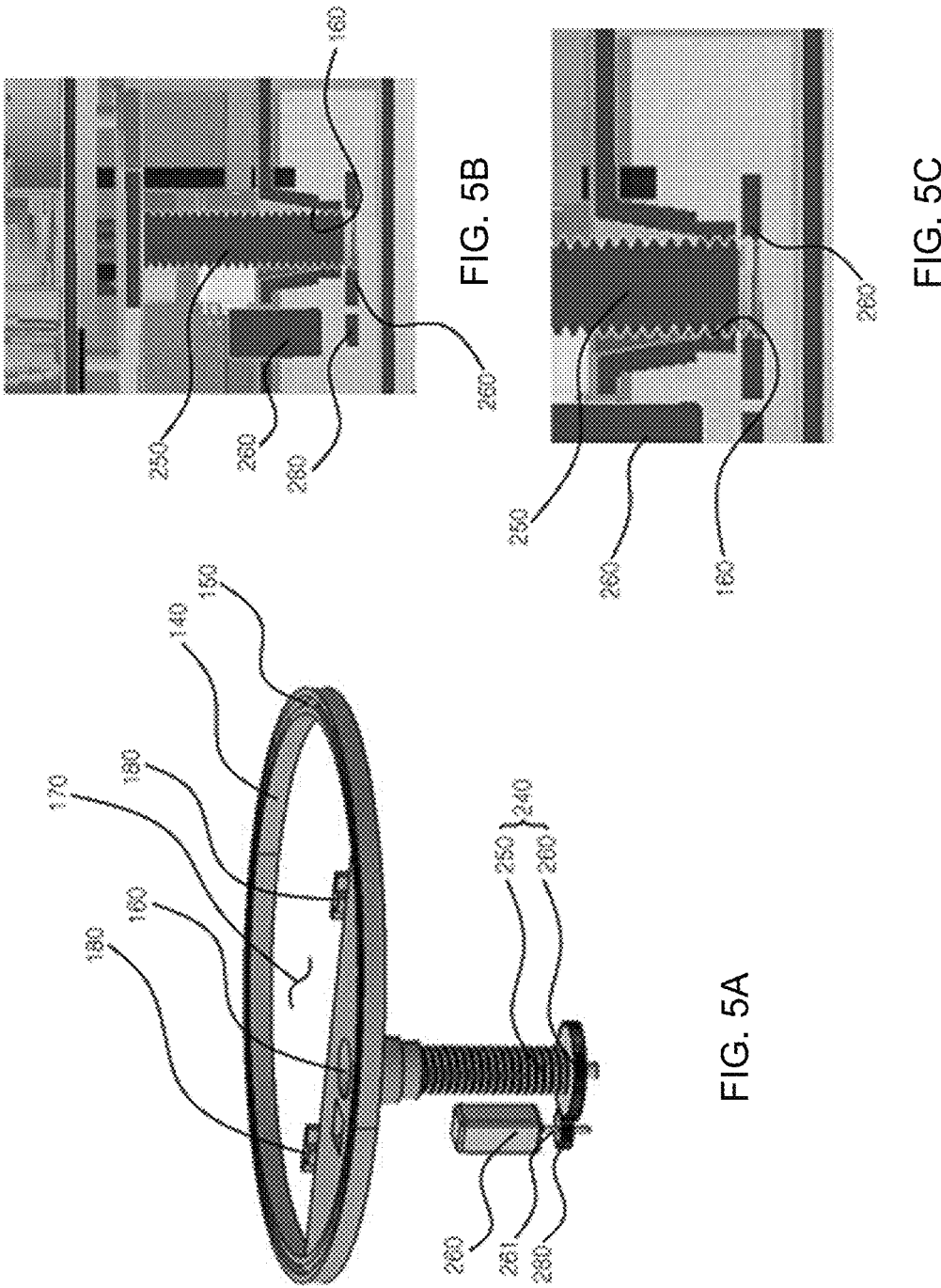
FIGS. 5A, 5B and 5C are views illustrating a sensor cover supporting unit in the sensor cleaning device according to an embodiment of the present disclosure.

FIG. 4 is a view in which the moving unit and the rotating unit are disassembled from the sensor cleaning device according to an embodiment of the present disclosure, and FIG. 5 is a view illustrating a sensor cover supporting unit of the sensor cleaning device according to an embodiment of the present disclosure.

The sensor cleaning device is described in reference to FIGS. 1-5.

The sensor device according to an embodiment of the present disclosure comprises a sensor 100 and a sensor cleaning device. The sensor cleaning device according to an embodiment of the present disclosure comprises a sensor cover 130, a moving unit, and a cleaning unit.

The sensor cover 130 is placed to cover an outer surface of a sensor lens 120 of a sensor 100. The sensor cover 130 may have a hollow cylindrical shape and may have a diameter greater than a diameter of the sensor lens 120.

The sensor cover 130 may be made of a transparent material. In the present embodiment, the sensor cover 130 may be made of tempered glass, but not limited thereto. In another embodiment, it may be made of a transparent, acrylic material.

The moving unit supports a bottom of the sensor cover 130 and moves the sensor cover 130 upward or downward parallel to the sensor lens 120.

The moving unit includes a sensor cover supporting unit 140, a base unit 190, a screw thread rotation gear 240, a first motor 270, and a second gear 280.

On an upper part of the sensor cover supporting unit 140, a sensor cover support grove 150 is formed and coupled to a lower part of the sensor cover 130.

A penetration hole 170 is formed on the sensor cover supporting unit 140 at a center thereof as illustrated in FIG. 5, and at least one movement guide 180 is formed at an inner surface of the penetration hole 170. Two movement guides 180 may be comprised in the present embodiment and are engaged with guide rails 230 described below to guide a movement of the sensor cover supporting unit 140.

The sensor cover supporting unit 140 comprises a screw hole 160 formed through the sensor cover supporting unit 140, an inner circumferential surface of which a screw thread 250 formed on. A screw thread rotation gear 240 described below is assembled with the screw hole 160, the upward or downward movement height may be adjusted according to the number of rotations of the screw thread rotation gear 240, and the sensor cover supporting unit 140 may move upward or downward according to the rotation direction of the screw thread rotation gear 240.

The base unit 190 includes a first base plate 200 and at least one guide rail 230 formed on the first base plate 200 and configured to guide the movement guide 180 upward or downward. The guide rail 230 extends vertically from the first base plate 200 as illustrated in FIG. 7. The guide rail 230 may be integrally formed with the first base plate 200.

Figure 6:
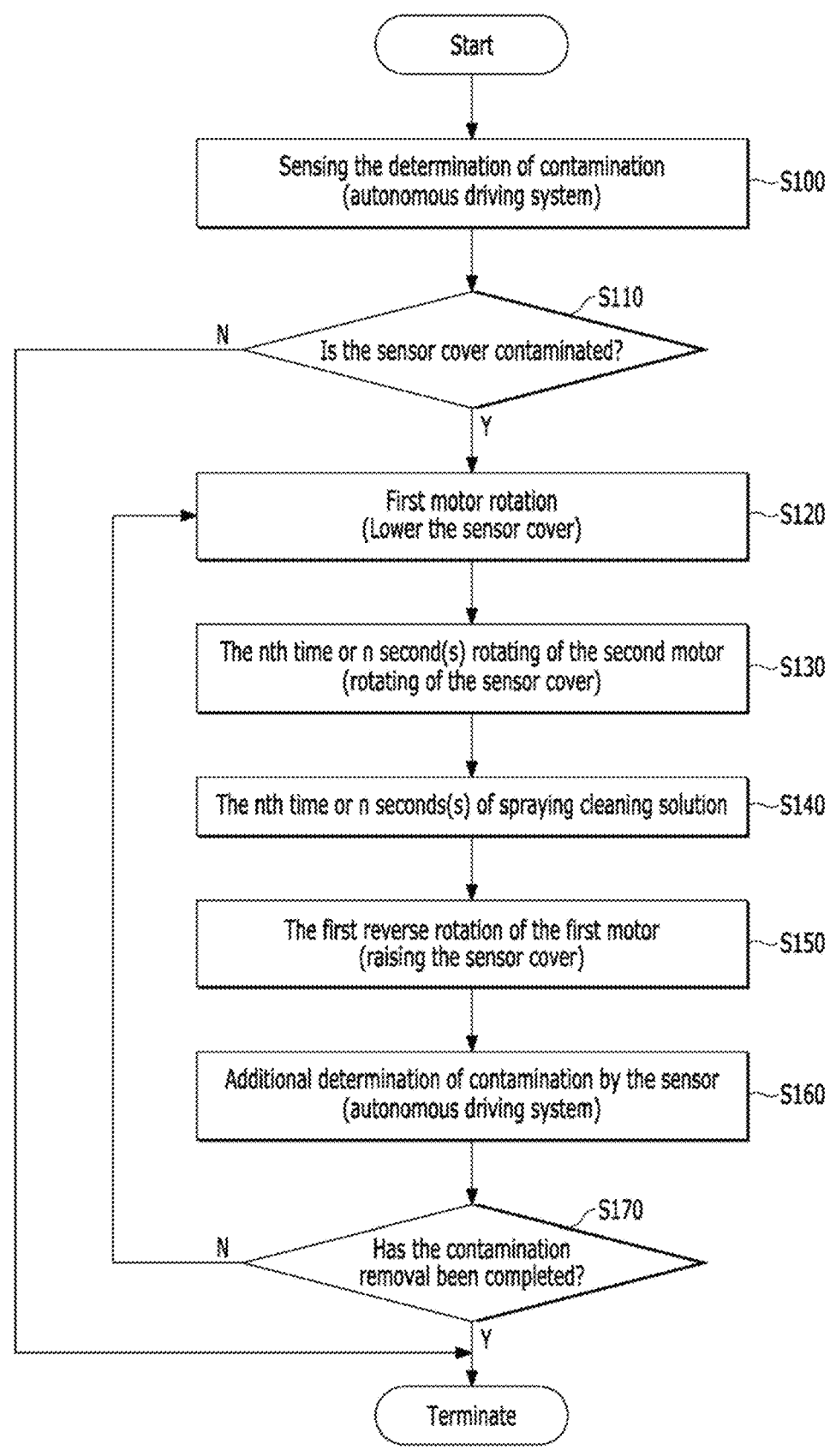
FIG. 6 is a flowchart illustrating an operation of a sensor cleaning device according to an embodiment of the present disclosure.

Referring to FIGS. 6 and 7, the base unit 190 further comprises a second base plate 210 formed at an upper end of the guide rail 230 and further comprises a first rotation roller 290 mounted on the second base plate 210 and a second rotation roller 300 mounted on the second base plate 210. The second base plate 210 and the guide rail 230 may be integrally formed. The second base plate 210 comprises a fixing shaft hole 220 into which a fixing shaft 410 described below is inserted.

The screw thread rotation gear 240 is rotatably supported by the first base plate 200, has a screw thread 250 formed on an outer surface thereof so as to be coupled to the screw hole 160, and the screw thread rotation gear 240 has a first gear 260 formed on a longitudinal end.

The first motor 270 is mounted on the first base plate 200.

The second gear 280 is fixed to a first motor shaft 271 of the first motor 270 and coupled with the screw thread rotation gear 240 in gear engagement.

When the sensor cover 130 descends as the sensor cover supporting unit 140 descends, the cleaning unit cleans the outer surface of the sensor cover 130 below the sensor 100.

The cleaning includes a cleaner, a spray nozzle 320, and a drying unit 330.

The cleaner contacts the outer surface of the sensor cover 130 when the sensor cover 130 is descending. The cleaner comprises a wiper 310. In the present embodiment, the cleaner is fixed and the sensor cover 130 is rotated by a rotating unit described below to wash the outer surface of the sensor cover 130, but in another embodiment, when the sensor cover 130 is descending, the cleaner may be configured to wash the outer surface of the sensor cover 130 while revolving around the sensor cover 130. In this case, the rotating unit described below may be configured not to rotate the sensor cover 130 but to rotate the cleaner, particularly a wiper.

The spray nozzle 320 sprays cleaning solution onto the outer surface of the sensor cover 130. The spray nozzle 320 comprises a plurality of spray holes (not shown), and the plurality of spray holes are arranged upward or downward that is the axial direction of the sensor cover 130.

The wiper 310 and the spray nozzle 320 may be integrated as in the present embodiment, and the spray nozzle 320 and the wiper 310 may be provided each at different positions.

As shown in FIG. 2, the drying unit 330 supplies dry air into a base cover 110 described below to dry the cleaning solution on the outer surface of the sensor cover 130 in the process of cleaning the sensor cover 130. The drying unit 330 may be at least a hot air blower or a blower.

The sensor cleaning device according to at least one embodiment of the present disclosure may further comprise a rotating unit. The rotating unit rotates the moving unit and the sensor cover 130.

The rotating unit comprises a second motor 340 including a second motor shaft 341. The second motor 340 is mounted on a fixing shaft 410 described below, a third gear 350 is provided on the second motor shaft 341, and the base unit 190 comprises a fourth gear 360 coupled with the third gear 350.

The sensor cleaning device further comprises a sensor supporting member 370 configured to support a lower part of the sensor 100.

The sensor supporting member 370 comprises a support plate 380, a fixing shaft 410, and a fixing plate 420.

The support plate 380 comprises a rotation rail part 390 formed on a lower surface thereof to provide rail surfaces in a circumferential direction, and a roller separation preventer 400 formed at an end of the rotation rail part 390 along the circumferential direction and protruding in an inner radial direction and an outer radial direction.

The first rotation roller 290 is in contact with an inner circumferential surface of the rotation rail part 390, and the second rotation roller 300 is in contact with an outer circumferential surface of the rotation rail part 390 to guide rotation of the base unit 190.

The fixing shaft 410 supports a lower center of the support plate 380 and supports the rotation of the second base plate 210. The base unit 190 and the fourth gear 360 supports the rotation and are mounted on the fixing shaft 410. The fourth gear 360 may be integrally formed on a lower part of the second base plate 210.

In addition, the fixing shaft 410 and the support plate 380 may be separated from each other. Accordingly, the second base plate 210 may be installed at the fixing shaft 410.

The fixing plate 420 is integrally formed with the lower part of the fixing shaft 410 and is fixed to a vehicle body of the autonomous vehicle. The method of fixing may vary, however, according to the embodiment, fixing via adhesives or fixing via multiple screws may be possible.

The sensor cleaning device comprises a base cover 110 for accommodating the moving unit, the rotating unit, and the cleaning unit. The base cover 110 may be installed under the sensor 100 and may have a diameter greater than the diameter of the sensor cover 130. The base cover 110 serves to prevent the cleaning solution from being scattered outside during the cleaning process of the sensor cover 130 and to uniformly supply air supplied through the drying unit 330 to the outer surface of the sensor cover 130.

In addition, the sensor cleaning device further comprises an upper cover 430 installed at an upper part of the sensor 100 and coupled to each other when the sensor cover 130 is moved upward. The upper cover 430 is made of an opaque material and serves to protect an upper part of the sensor 100. The upper cover 430 has a protruding unit 440 formed downward to be spaced apart from an upper part of the sensor 100.

A wiping blade 450 is placed at an upper part of the sensor cover 130 to wipe the surface of the sensor lens 120. The wiping blade 450 contacts the sensor lens 120 when the sensor cover 130 descends or ascends to scrape the dust on the sensor lens 120 and prevents rainwater from being introduced between the sensor lens 120 and the sensor cover 130. In the present embodiment, the wiping blade 450 may have a circular cross-section, but according to an embodiment, a cross-section thereof may be of a triangular shape to reduce a contact area with the sensor lens 120.

In addition, when the sensor cover 130 is moved upward, a space between the upper part of the sensor cover 130 and the lower part of the upper cover 430 is sealed to prevent rainwater from flowing into the sensor cleaning device.

Next, the method of controlling the sensor cleaning device is described with reference to FIG. 6.

FIG. 6 is a flowchart illustrating an operation of a sensor cleaning device according to an embodiment of the present disclosure.

As shown in FIG. 6, the method of controlling the sensor cleaning device includes a contamination determining step, a descending step, a cleaning step, and an ascending step.

In the contamination determining step, the surface contamination of the sensor cover 130 is determined (S100). The contamination determining step is determined through a sensing result, e.g., a sensing accuracy of the sensor 100 in a process in which the sensor 100 scans the surroundings of the autonomous vehicle. In detail, when the sensor 100 scans the surroundings of the autonomous vehicle, if noise is severely included, the sensor cover 130 is determined to be contaminated and the process proceeds to the descending step, and if there is no or little noise, i.e., under a threshold level, the sensor cover is determined to be not contaminated and the process is terminated (S110).

The descending step is a step of lowering the sensor cover 130 (S120). The descending step is a step of lowering the sensor cover 130 into the base cover 110 provided at the lower part of the sensor 100 by driving the first motor 270.

The cleaning step is a step of cleaning the lowered sensor cover 130.

In the cleaning step, the second motor 340 is rotated to clean the sensor cover 130 by rotating the sensor cover predetermined times or predetermined seconds. In the present embodiment, the sensor cover 130 may be rotated at least once or for at least 5 seconds to be cleaned (S130).

Also, in the cleaning step, the cleaning solution may be sprayed nth times when the sensor cover 130 is rotating. In this embodiment, the cleaning solution may be sprayed at least once or for at least 5 seconds (S140).

The ascending step is a step of ascending the sensor cover 130 (S150). In the ascending step, the sensor cover 130 is ascended from the inside of the base cover 110 provided at the lower part of the sensor 100 to the outside by driving the first motor 270 oppositely to the descending step.

The method may further include an additional cleaning determination step of additionally determining surface contamination of the sensor cover 130 to determine whether additional cleaning is required after the ascending step (S160). If the additional contamination determination of the sensor cover 130 is performed again and it is determined that the cleaning of the sensor cover 130 is not completed or the contaminants have not been removed in consideration of sensing noise over the threshold after the sensor cover 130 is raised and the sensor 100 scans the surroundings of the autonomous vehicle, then the process proceeds again to the descending step (S120), and if the noise level is satisfactory, then it is determined the contamination is removed (S170) and the process terminates.

In the present disclosure, the sensor 100 may comprise a LiDAR sensor, without being limited thereto.

Although the above description has been focused on the embodiments, this is merely an example, and the present disclosure is not limited thereto, and it should be understood by those having ordinary skill in the art that various modifications and applications that are not illustrated above may be made without departing from the essential characteristics of the present disclosure. For example, each component specifically shown in the embodiment may be modified and implemented. Further, the differences related to the modifications and applications should be interpreted as being included in the scope of the present disclosure defined in the appended claims.

DESCRIPTION OF SYMBOLS

100: Sensor
110: Base cover
120: Sensor lens
130: Sensor cover
140: Sensor cover supporting unit
150: Sensor cover support groove
160: Screw hole
170: Penetration hole
180: Movement guide
190: Base unit
200: First base plate
210: Second base plate
220: Fixing shaft hole
230: Guide rail
240: Screw thread rotation gear
250: Screw thread
260: First gear
270: First motor
271: First motor shaft
280: Second gear
290: First roller
300: Second roller
310: Wiper
320: Spray nozzle
330: Drying unit
340: Second motor
341: Second motor shaft
350: Third gear
360: Fourth gear
370: Sensor supporting member
380: Support plate
390: Rotating rail part
400: Roller separation preventer
410: Fixing shaft
420: Fixing plate
430: Upper cover
440: Protruding unit
450: Wiping blade

What is claimed is:

1. A sensor cleaning device comprising:

a sensor cover configured to cover an outer surface of a sensor lens;

a moving unit configured to support the sensor cover and move the sensor cover linearly along a vertical axis between an upper first position and a lower second position, the sensor lens being covered at the upper first position and exposed at the lower second position; and a cleaning unit located at a cleaning region spatially separated from the sensor lens, the cleaning unit being configured to clean an outer surface of the sensor cover when the sensor cover is positioned at the lower second position.

2. The sensor cleaning device of claim 1, further comprising a rotating unit configured to rotate the moving unit and the sensor cover.

3. The sensor cleaning device of claim 2, wherein the moving unit comprises:

a sensor cover supporting unit comprising a sensor cover support groove configured to be coupled to a lower part of the sensor cover on an upper portion of the cover supporting unit, at least one movement guide, and a screw hole formed through the cover supporting unit and comprising first threads on an inner circumferential surface of the screw hole;

a base unit comprising a first base plate and at least one guide rail placed on the first base plate and configured to guide a movement of the least one movement guide;

a threaded gear rotatably supported by the first base plate, the threaded gear comprising second threads on an outer surface thereof to be coupled with the first threads of the screw hole and a first gear;

a first motor supported by the first base plate; and a second gear connected to a first motor shaft of the first motor and coupled with the threaded gear in gear engagement.

4. The sensor cleaning device of claim 3, wherein the rotating unit comprises a second motor comprising a second motor shaft connected to a third gear, and wherein the base unit comprises a fourth gear coupled to the third gear in gear engagement.

5. The sensor cleaning device of claim 1 wherein the cleaning unit comprises:

a cleaner contacting the outer surface of the sensor cover when the sensor cover is positioned at the lower second position;

a spray nozzle that sprays cleaning solution on the outer surface of the sensor cover; and a drying unit that dries the sensor cover by supplying air.

6. The sensor cleaning device of claim 5, wherein the cleaner comprises a wiper.

7. The sensor cleaning device of claim 5 wherein the spray nozzle comprises a plurality of spray holes arranged in a row along a longitudinal direction of the sensor cover.

8. The sensor cleaning device of claim 4, wherein the base unit further comprises a second base plate formed at an end of an upper part of the at least one guide rail, and wherein the sensor cleaning device further comprises a first roller mounted on the second base plate and a second roller mounted on the second base plate.

9. The sensor cleaning device of claim 8, wherein the rotating unit further comprises a sensor supporting member supporting a lower part of the sensor, and wherein the sensor supporting member comprises:

a support plate comprising a rotating rail part and a roller separation preventer protruding inward and outward in a radial direction on an end of the rotating rail part;

a fixing shaft supporting a lower center portion of the support plate and rotatably supporting the second base plate; and a fixing plate formed on a lower part of the fixing shaft.

10. The sensor cleaning device of claim 9, wherein the base unit and a fourth gear are mounted on the fixing shaft, wherein the first roller contacts an inner circumferential surface of the rotating rail part, and wherein the second roller contacts an outer circumferential surface of the rotating rail part to guide a rotation of the base unit.

11. The sensor cleaning device of claim 1, further comprising an upper cover configured to be coupled to an upper part of the sensor cover.

12. The sensor cleaning device of claim 11, wherein the sensor cover comprises a wiping blade on an upper part thereof which is configured to clean a surface of the sensor lens while the sensor cover moves.

13. A method for controlling a sensor cleaning device, the method comprising:

determining surface contamination of a sensor cover positioned to cover a sensor;

descending the sensor cover by moving the sensor cover linearly downward from an upper first position, at which a sensor lens is covered, to a lower second position, at which the sensor lens is exposed and a cleaning region spatially separated from the sensor lens is located;

cleaning the sensor cover when the sensor cover is positioned at the lower second position; and ascending the sensor cover from the lower second position to return to the upper first position.

14. The method of claim 13, further comprising determining whether to additionally clean the sensor cover by determining additionally surface contamination of the sensor cover after the ascending of the sensor cover.

15. The method of claim 13, wherein the determination of the surface contamination comprises determining the surface contamination through a sensing result of the sensor.

16. The method of claim 13, wherein the cleaning of the sensor cover comprises rotating the sensor cover by a rotating unit.

17. The method of claim 16, wherein the cleaning of the sensor cover comprises spraying cleaning solution while the sensor cover being rotated.

18. A sensor device comprising:

a sensor comprising a sensor lens;

a sensor cover configured to cover an outer surface of the sensor lens;

a moving unit configured to move the sensor cover linearly along a vertical axis between an upper first position at which the sensor lens is covered by the sensor cover and a lower second position at which the sensor lens is exposed and a cleaning region spatially separated from the sensor lens is located; and a cleaning unit configured to clean an outer surface of the sensor cover when the sensor cover is positioned at the lower second position.

19. The sensor device of claim 18, wherein the sensor comprises a Light Detection and Ranging (LiDAR) sensor.

\* \* \* \* \*